United States Patent
Bower, III et al.

(10) Patent No.: US 10,764,321 B2
(45) Date of Patent: Sep. 1, 2020

(54) IDENTIFYING AND REMEDIATING AT-RISK RESOURCES IN A COMPUTING ENVIRONMENT

(71) Applicant: LENOVO ENTERPRISE SOLUTIONS (SINGAPORE) PTE. LTD., Singapore (SG)

(72) Inventors: Fred Allison Bower, III, Durham, NC (US); Gary David Cudak, Wake Forest, NC (US); Ajay Dholakia, Cary, NC (US); William Gavin Holland, Cary, NC (US); Scott Kelso, Cary, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 143 days.

(21) Appl. No.: 15/079,160

(22) Filed: Mar. 24, 2016

(65) Prior Publication Data
US 2017/0279844 A1    Sep. 28, 2017

(51) Int. Cl.
*H04L 29/06* (2006.01)
*G06N 5/04* (2006.01)

(52) U.S. Cl.
CPC ...... *H04L 63/1441* (2013.01); *H04L 63/1416* (2013.01); *H04L 63/1425* (2013.01); *G06N 5/04* (2013.01)

(58) Field of Classification Search
CPC . H04L 63/1433; H04L 63/145; G06F 21/577; G06F 3/0481; G06N 5/04

USPC .......................................................... 726/23
See application file for complete search history.

(56) References Cited

U.S. PATENT DOCUMENTS

| | | | |
|---|---|---|---|
| 6,711,127 B1 * | 3/2004 | Gorman | H04L 63/1433 370/230 |
| 8,261,355 B2 | 9/2012 | Rayes et al. | |
| 8,321,944 B1 * | 11/2012 | Mayer | G06F 21/577 726/22 |
| 8,898,784 B1 * | 11/2014 | Alexander | H04L 63/145 709/232 |
| 9,015,121 B1 | 4/2015 | Salamon et al. | |
| 9,461,877 B1 * | 10/2016 | Nadeau | H04L 41/12 |
| 2004/0210654 A1 * | 10/2004 | Hrastar | H04L 41/12 709/224 |
| 2005/0010649 A1 * | 1/2005 | Payne | G08B 13/19656 709/217 |

(Continued)

*Primary Examiner* — Bryan F Wright
(74) *Attorney, Agent, or Firm* — Kunzler Bean & Adamson; Bruce R. Needham

(57) ABSTRACT

Methods and systems of identifying and remediating at-risk resources in a computing environment are provided. A method includes periodically determining respective infrastructure topologies of a computing environment that changes over time, wherein the determining is performed by a computer system communicating with the computing environment. The method also includes: identifying, by the computer system, an intrusion event in the computing environment; determining, by the computer system, at-risk resources in the computing environment based on the determined intrusion event and a corresponding one of the infrastructure topologies; and performing, by the computer system, remediation action for the at-risk resources.

19 Claims, 7 Drawing Sheets

(56) References Cited

U.S. PATENT DOCUMENTS

| | | | |
|---|---|---|---|
| 2009/0125846 A1* | 5/2009 | Anderson | G06F 3/0481 |
| | | | 715/853 |
| 2009/0316602 A1* | 12/2009 | Nandy | H04L 45/02 |
| | | | 370/254 |
| 2012/0072985 A1* | 3/2012 | Davne | H04L 63/0272 |
| | | | 726/22 |
| 2013/0111548 A1* | 5/2013 | Kanoun | G06F 21/577 |
| | | | 726/1 |
| 2014/0007189 A1 | 1/2014 | Huynh et al. | |
| 2014/0007241 A1* | 1/2014 | Gula | H04L 63/1433 |
| | | | 726/25 |
| 2014/0013434 A1* | 1/2014 | Ranum | H04L 63/145 |
| | | | 726/24 |
| 2014/0089506 A1 | 3/2014 | Puttaswamy et al. | |
| 2016/0255104 A1* | 9/2016 | Eslambolchi | H04L 63/1416 |
| | | | 726/23 |
| 2017/0063912 A1* | 3/2017 | Muddu | G06N 5/04 |

* cited by examiner

IDENTIFYING AND REMEDIATING AT-RISK RESOURCES IN A COMPUTING ENVIRONMENT

TECHNICAL FIELD

The present disclosure relates to network and system security in distributed computing environments and, more particularly, to a method and system for correlating and remediating temporally accessible objects during an attack period in a software-defined environment.

BACKGROUND

Network and system security are of upmost importance in distributed computing environments such as data center environments. Due to the interconnectedness of resources within a distributed computing environment, a security breach at one resource in the environment can result in other resources of the environment being at risk.

Software-defined environments (SDE) increasingly deploy software-defined networking (SDN) and software-defined storage (SDS) to manage the resources within an environment (such as a data center), resulting in the environment infrastructure changing over periods of time. The changing of the environment infrastructure in turn results in access changes to various resources of the environment from any one particular system in the environment. Many of the changes to the environment infrastructure occur autonomously. With such changing environments, it is difficult to know what resources in an environment are affected by a security breach in the environment.

SUMMARY

In a first aspect, there is a method of identifying and remediating at-risk resources in a computing environment. The method includes periodically determining respective infrastructure topologies of a computing environment that changes over time, wherein the determining is performed by a computer system communicating with the computing environment. The method also includes: identifying, by the computer system, an intrusion event in the computing environment; determining, by the computer system, at-risk resources in the computing environment based on the determined intrusion event and a corresponding one of the infrastructure topologies; and performing, by the computer system, remediation action for the at-risk resources.

In another aspect, there is a system that includes a computing environment having resources that are re-arranged into different topologies over time. The system also includes a server connected to the computing environment and configured to: periodically determine a respective topology of the computing environment; identify an intrusion event in the computing environment; determine at-risk resources in the computing environment based on the determined intrusion event and a corresponding one of the determined topologies; and perform remediation action for the determined at-risk resources.

In another aspect, there is a computer program product for identifying and remediating at-risk resources in a computing environment. The computer program product includes a computer readable storage medium having program instructions embodied therewith. The program instructions are executable by a computer device to cause the computer device to: periodically determine a respective topology of a computing environment comprising a number of reconfigurable resources, wherein the topology defines which of the resources have access to one another within the computing environment at a given time; identify an intrusion event including an intrusion time and an intrusion location in the computing environment; determine at-risk resources in the computing environment based on the determined intrusion event and a corresponding one of the determined topologies; and perform remediation action for the determined at-risk resources including at least one of: transmitting a message to an administrator identifying the determined at-risk resources; and altering the computing environment to isolate the determined at-risk resources.

BRIEF DESCRIPTION OF THE DRAWINGS

The present disclosure is described in the detailed description which follows, in reference to the noted plurality of drawings by way of non-limiting examples of exemplary embodiments of the present disclosure

DETAILED DESCRIPTION OF ASPECTS DESCRIBED HEREIN

The present disclosure relates to network and system security in distributed computing environments and, more particularly, to a method and system for correlating and remediating temporally accessible objects during an attack period in a software-defined environment. According to aspects described herein, the topology of a distributed computing environment is periodically analyzed at time intervals to determine accessibility between various resources in the environment at a given time. When a security breach is detected in the environment, the time and location of the security breach is compared to the previously determined accessibility for the time corresponding to the security breach. In this manner, when a security breach is detected at a particular time and a particular resource in the environment, at-risk resources that the particular resource had access to at the particular time may be identified. Remediation action may then be taken with respect to the particular resource where the security breach occurred, as well as the at-risk resources.

As described herein, implementations may be a system, a method, and/or a computer program product. The computer program product may include a computer readable storage medium (or media) having computer readable program instructions thereon for causing a processor to carry out aspects described herein.

Figure 1:
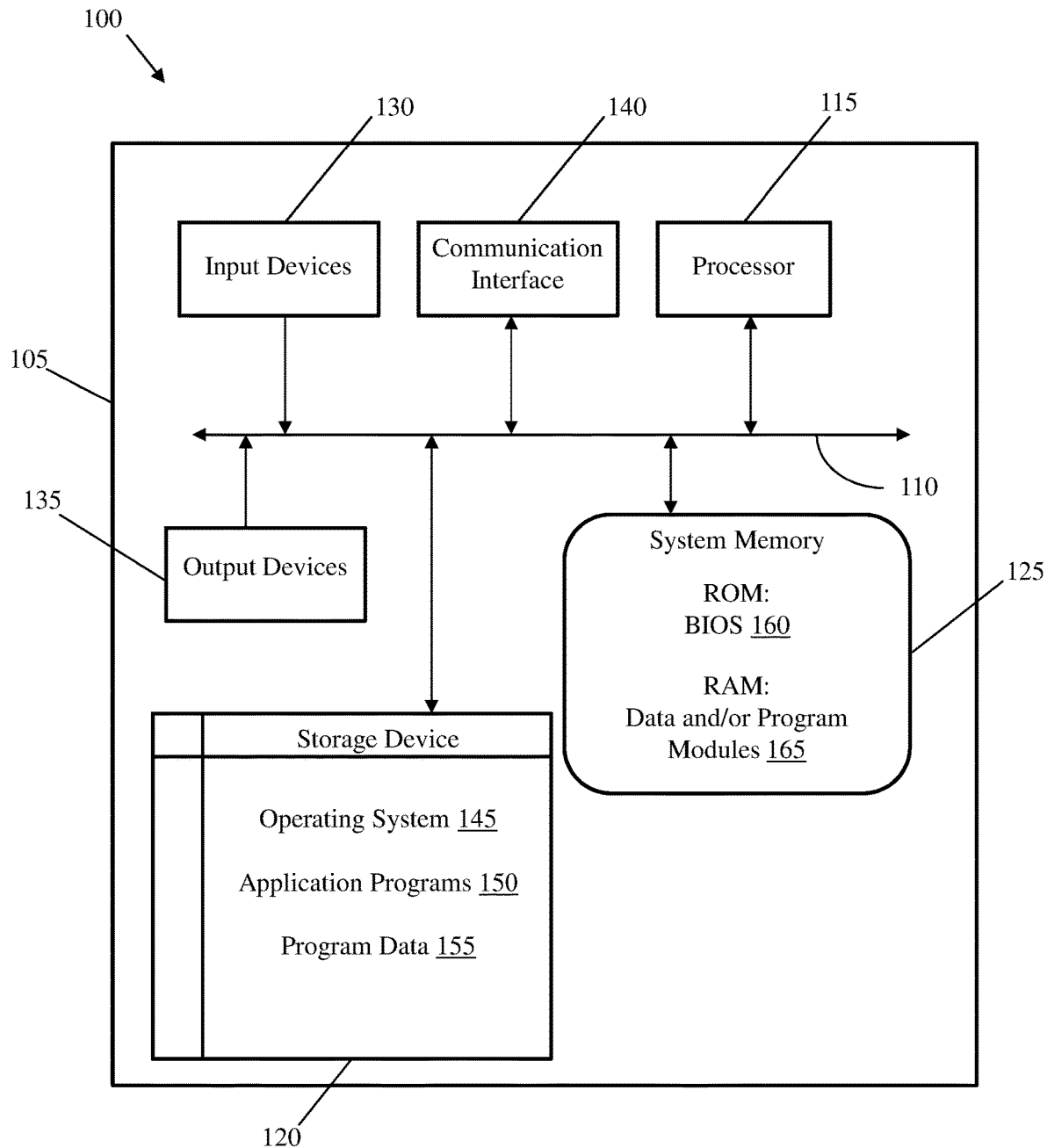
FIG. 1 is an illustrative architecture of a computing system in accordance with aspects described herein.

FIG. 1 is an illustrative architecture of a computing system in accordance with aspects described herein. The computing system 100 is only one example of a suitable computing system and is not intended to suggest any limitation as to the scope of use or functionality of aspects described herein. The computing system 100 includes a computing device 105. The computing device 105 can be resident on a network infrastructure such as within a cloud environment (shown in FIG. 2), or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations described herein, which may be operatively implemented by the computer readable program instructions. For example, processor 115 may execute one or more applications and/or program modules that: periodically determine a topology of a software defined environment; identify an intrusion event in the environment; determine at-risk resources in the environment based on a determined topology at a time corresponding to the intrusion event; and perform remediation action for the determined at-risk resources.

In embodiments, processor 115 may receive input signals from one or more input devices 130 and/or drive output signals through one or more output devices 135. The input devices 130 may be, for example, a keyboard or touch sensitive user interface (UI). The output devices 135 can be, for example, any display device, printer, etc.

The storage device 120 may include removable/non-removable, volatile/non-volatile computer readable storage media, such as, but not limited to, non-transitory media such as magnetic and/or optical recording media and their corresponding drives. The drives and their associated computer readable storage media provide for storage of computer readable program instructions, data structures, program modules and other data for operation of computing device 105 in accordance with the different aspects described herein. In embodiments, storage device 120 may store operating system 145, application programs 150, and program data 155 that perform the processes described herein.

The system memory 125 may include a computer readable storage medium, including for example, non-transitory media such as flash memory, permanent memory such as read-only memory ("ROM"), semi-permanent memory such as random access memory ("RAM"), any other suitable type of storage component, or any combination thereof. A computer readable storage medium, as used herein, is not to be construed as being a transitory signal per se. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to periodically determine a topology of a software defined environment; identify an intrusion event in the environment; determine at-risk resources in the environment based on a determined topology at a time corresponding to the intrusion event; and perform remediation action for the determined at-risk resources. In particular, computing device 105 may perform tasks (e.g., processes, steps, methods and/or functionality) in response to processor 115 executing program instructions contained in a computer readable storage medium, such as system memory 125. The program instructions may be read into system memory 125 from another computer readable storage medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the results of such tasks in accordance with aspects described herein. The steps, methods and/or functionality disclosed herein can be implemented in any combination of hardware circuitry and software.

Figure 2:
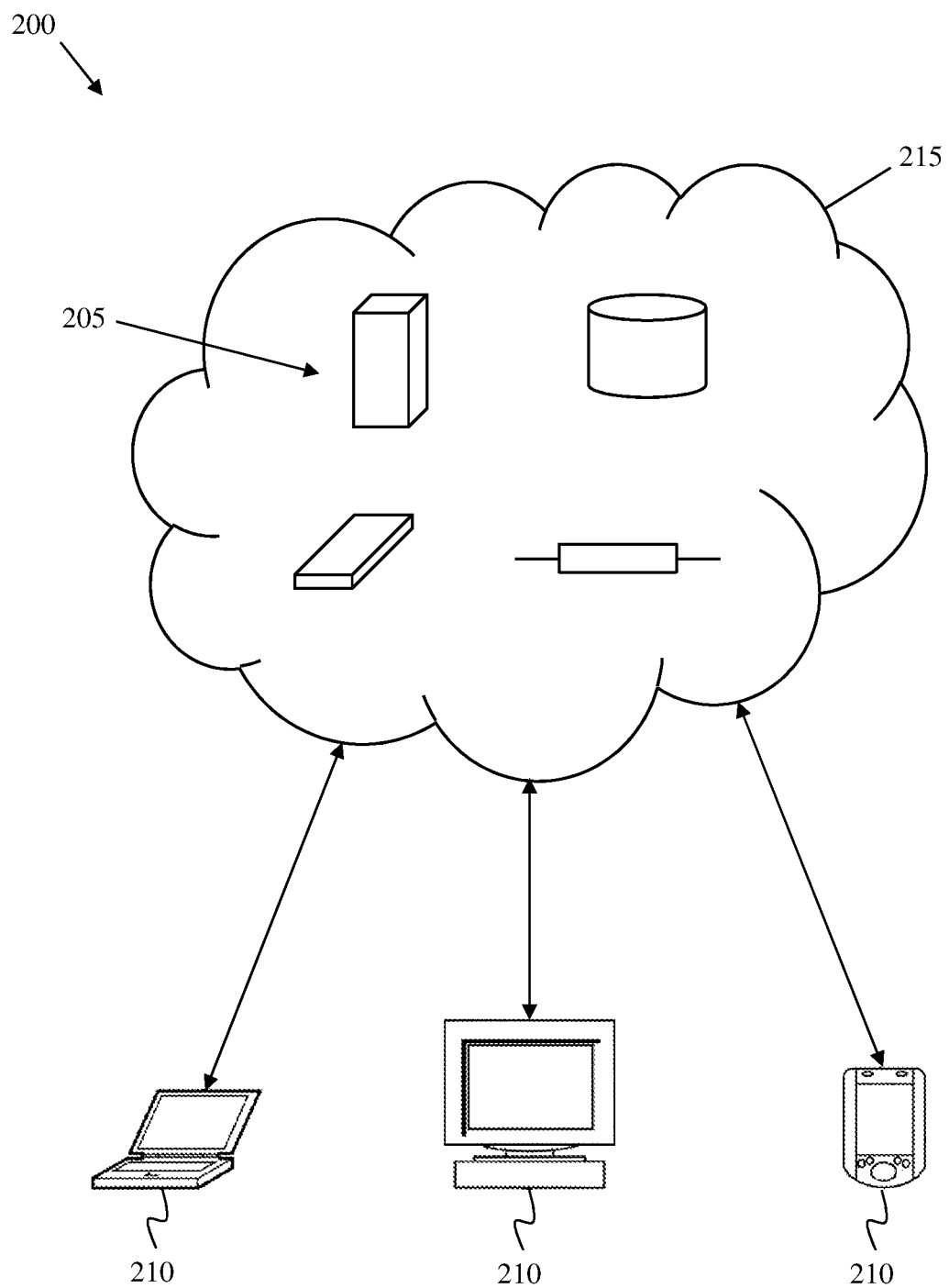
FIG. 2 shows an exemplary cloud computing environment in accordance with aspects described herein.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. In embodiments, as described herein, cloud resources 205 may include a software defined environment including a network management server that: periodically determines a topology of the environment; identifies an intrusion event in the environment; determines at-risk resources in the environment based on a determined topology at a time corresponding to the intrusion event; and performs remediation action for the determined at-risk resources Cloud resources 205 may be on a single network or a distributed network. Cloud resources 205 may be distributed across multiple cloud computing systems and/or individual network enabled computing devices.

Client devices 210 may comprise any suitable type of network-enabled computing device, such as servers, desktop computers, laptop computers, handheld computers (e.g., smartphones, tablet computers), set top boxes, and network-enabled hard drives.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

Figure 3:
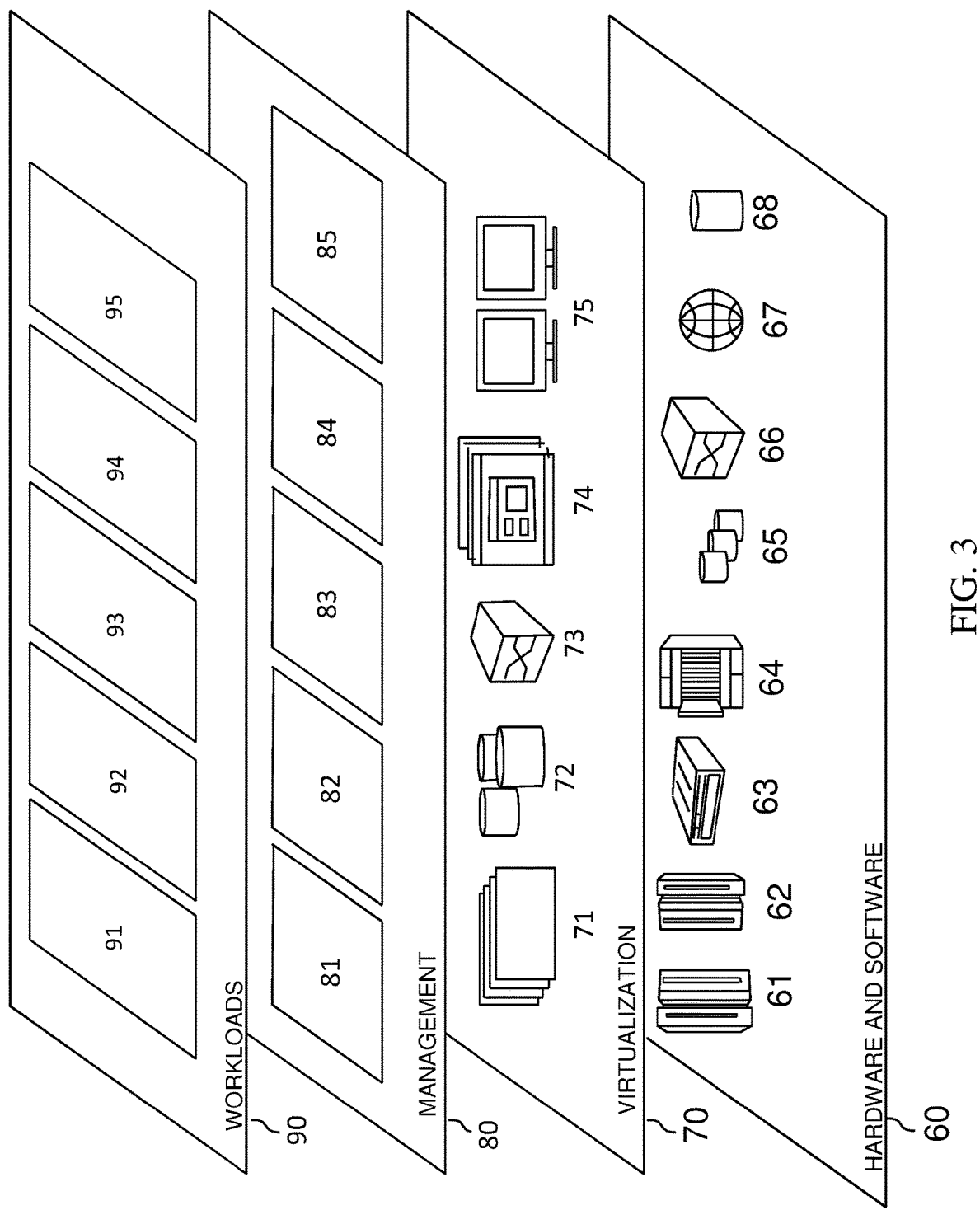
FIG. 3 shows abstraction layers of cloud functionality in accordance with aspects described herein.

Referring now to FIG. 3, a set of functional abstraction layers provided by cloud computing environment (e.g., the cloud computing environment 200 of FIG. 2) is shown. It should be understood in advance that the components, layers, and functions shown in FIG. 3 are intended to be illustrative only and embodiments of aspects described herein are not limited thereto. As depicted, the following layers and corresponding functions are provided within the exemplary cloud computing environment described herein.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

In embodiments, aspects described herein may be implemented within one or more layers 60, 70, 80, 90. For example, virtualization layer 70 and/or management layer 80 may include one or more components that: periodically determine a topology of a software defined environment; identify an intrusion event in the environment; determine at-risk resources in the environment based on a determined topology at a time corresponding to the intrusion event; and perform remediation action for the determined at-risk resources.

Figure 4:
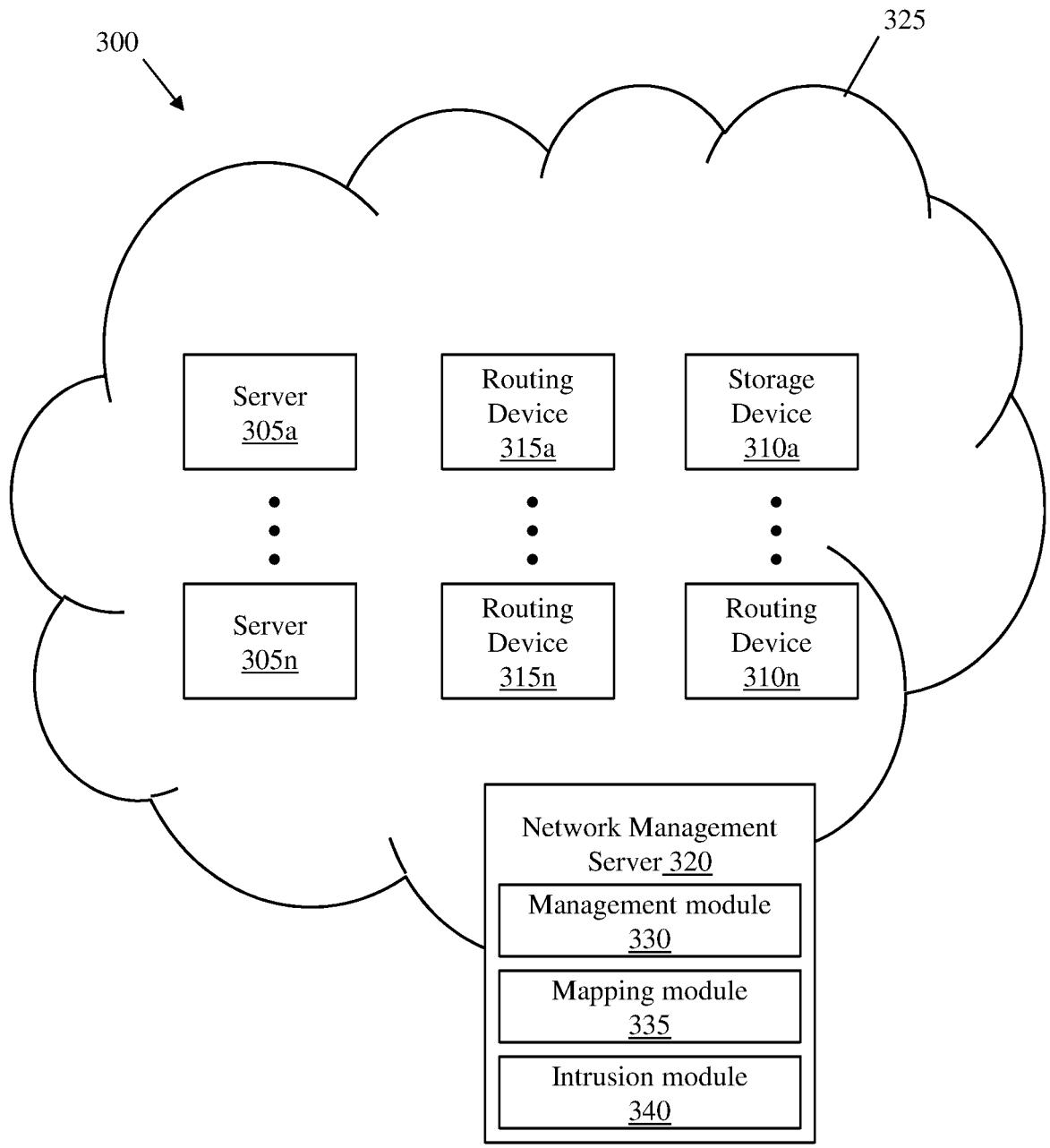
FIGS. 4, 5A, and 5B show block diagrams of an environment in accordance with aspects described herein.

FIG. 4 depicts an illustrative environment for implementing the steps in accordance with aspects described herein. The environment illustrated in FIG. 4 is exemplary and not intended to be limiting. Aspects described herein may be used with any desired computing environment, including ones different from that shown in the figures.

Referring now to FIG. 4, a distributed computing environment 300 includes a plurality of resources (e.g., network devices) such as servers 305a-n, storage devices 310a-n, and network routing devices 315a-n. The environment 300 of FIG. 4 may be a cloud computing environment and the resources may be embodied as cloud resources, such as such as cloud computing environment 200 and cloud resources 205 described with respect to FIG. 2. In a preferred embodiment, the environment 300 comprises a software-defined environment, in particular a data center, that utilizes software-defined networking and/or software-defined storage to change environment topology, as described in greater detail herein.

In the environment 300 of FIG. 4, each server 305a-n may comprise a computing device such as computing device 105 of FIG. 1. For example, one or more of the servers 305a-n may comprise an application server that hosts an application program and serves the application program to a networked client computing device. As another example, one or more of the servers 305a-n may comprise a hypervisor that hosts one or more virtual machines (VMs).

With continued reference to the environment 300 of FIG. 4, each storage device 310a-n may comprise a computing device that stores data. For example, one or more of the storage devices 310a-n may comprise a Redundant Array of Independent Disks (RAID), or other type of computer-based storage device. The environment 300 may employ logical unit numbers (LUNs) to identify logical drives in one or more of the storage devices 310a-n. The storage devices 310a-n may store data that is accessed by the servers 305a-n. For example, depending on the topology of the environment 300, a particular one of the servers 305a-n may have access (e.g., read and/or write access) to the data on one or more of the storage devices 310a-n.

Still referring to the environment 300 of FIG. 4, the network routing devices 315a-n comprise devices that route communication between resources of the environment, e.g., between the servers 305a-n and the storage devices 310a-n. For example, each network routing device 315a-n may comprise a network router, network switch, etc.

As shown in FIG. 4, the environment 300 includes a network management server 320. In embodiments, the network management server 320 controls the configuration of the resources of the environment 300. The network management server 320 may comprise a computing device, such as a computing device 105 of FIG. 1, that is communicatively connected by a network 325 to each of the servers 305a-n, storage devices 310a-n, and network routing devices 315a-n. The network 325 may be any suitable computer network or combination of computer networks including but not limited to LAN, WAN, intranet, Internet, cloud network, etc.

In embodiments, the network management server 320 includes a management module 330, a mapping module 335, and an intrusion module 340. The mapping module 335 and intrusion module 340 are described herein with respect to FIGS. 5A and 5B. The management module 330 is configured to manage the resources within the environment 300. The management module 330 may include one or more program modules such as program module 165 as described with respect to FIG. 1. In embodiments, the management module 330 includes software-defined networking (SDN) and/or software-defined storage (SDS) modules that are used to arrange desired configurations of resources within the environment 300. For example, using SDN techniques, the management module 330 may create a virtual local area network (VLAN) amongst certain resources within the environment 300 in which a subset of ports in the environment 300 are grouped and provided access to one another for transmitting and receiving data. In another example, using SDS techniques, the management module 330 may provision, partition, and/or remove network drives or LUNs, and define which VMs are mapped to the LUNs.

Figure 5A:
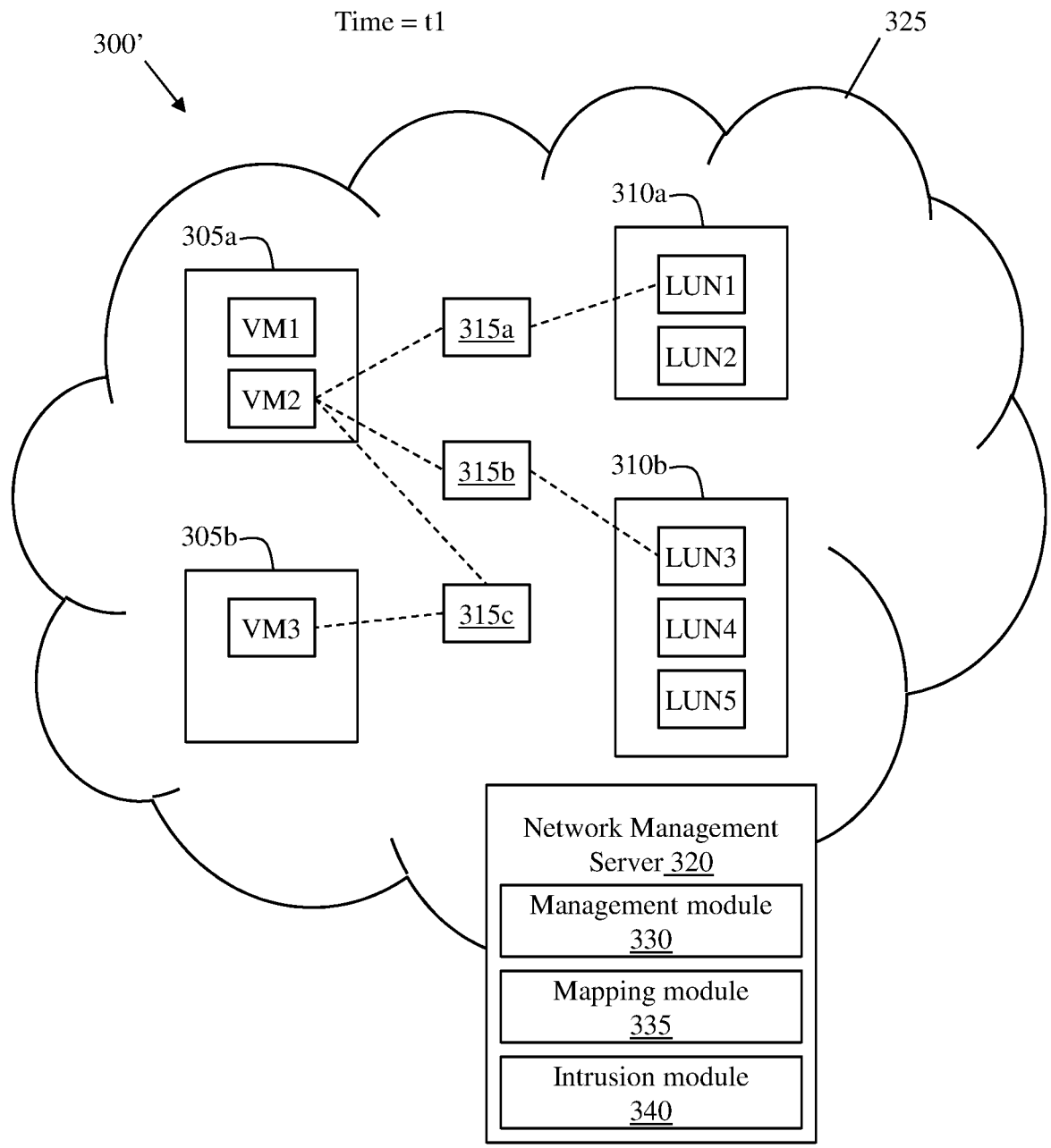
Figure 5B:
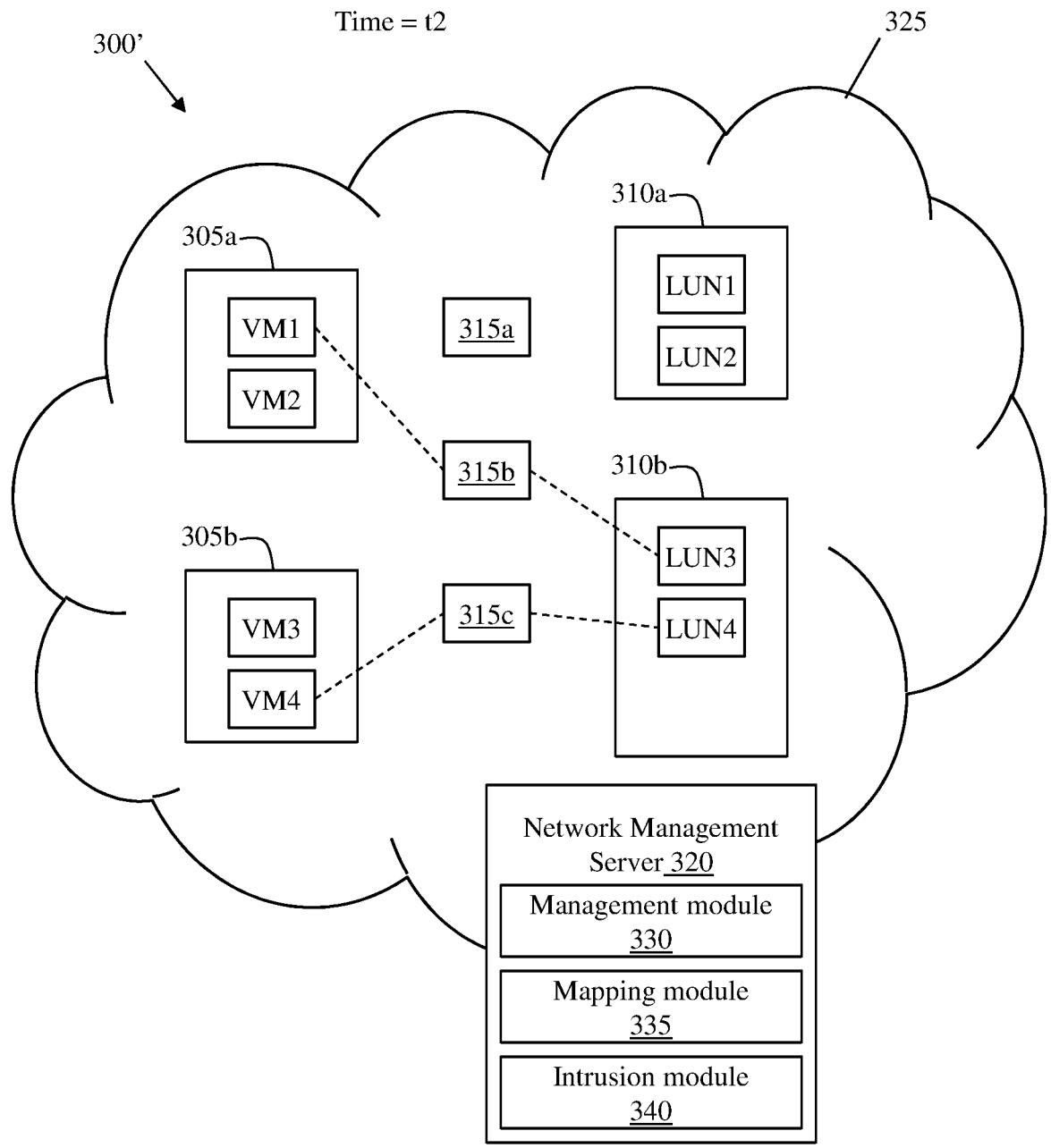

In accordance with aspects described herein, the management module 330 may cause the environment 300 to have different topologies (i.e., configurations) at different times. For example, FIGS. 5A and 5B show an exemplary implementation of the environment 300' having different topologies at different times. Specifically, FIG. 5A shows the environment 300' configured in a first topology at a first time t1, and FIG. 5B shows the environment 300' configured in a second topology at a second time t2.

As shown in FIG. 5A, at time t1 the environment 300' comprises resources including: first server 305a hosting virtual machines VM1, VM2; second server 305b hosting virtual machine VM3; first storage device 310a partitioned into logical units LUN1, LUN2; second storage device 310b partitioned into logical units LUN3, LUN4, LUN5; first network routing device 315a; second network routing device 315b; and third network routing device 315c.

As shown in FIG. 5B, at time t2 the environment 300' comprises resources including: first server 305a hosting virtual machines VM1, VM2; second server 305b hosting virtual machines VM3, VM4; first storage device 310a partitioned into logical units LUN1, LUN2; second storage device 310b partitioned into logical units LUN3, LUN4; first network routing device 315a; second network routing device 315b; and third network routing device 315c. The environment 300' also includes network management server 320 and network 325, as described with respect to FIG. 4. The illustrated environment 300' is exemplary and not intended to limit, and different environments with different arrangements of resources may be used in implementations.

As shown in FIG. 5A, at time t1, the environment 300' has a first topology in which VM2 has access to (i.e., may communicate with) LUN1, LUN3, and VM3. As shown in FIG. 5B, at time t2, the environment 300' has a second topology in which VM2 no longer has access to any other resources, but in which VM1 has access to LUN2 and VM4 has access to LUN4. Time t1 is different than time t2, and the times t1, t2 may represent any desired times, such as different times during a same day, different times on different days, etc. In embodiments, the change in topology between the different times t1, t2 is controlled by the network management server 320, e.g., by SDN and/or SDS modules of the management module 330, and may be based on any desired parameter(s) such as, for example, providing different functionalities to different clients at different times. In aspects described herein, the different topologies have different resources and/or different access between certain resources. The illustrated topologies are exemplary and are not intended to limit, and different topologies may be used in implementations.

According to aspects described herein, the mapping module 335 periodically determines the topology of the environment 300' and stores data defining the determined topologies. As used herein, determining the topology includes determining which resources have access to other resources within the environment. For example, referring to FIG. 5A, at time t1 the mapping module 335 determines that VM2 has access to LUN1 via switch 315a, that VM2 has access to LUN3 via switch 315b, and that VM2 has access to VM3 via 315c. Similarly, referring to FIG. 5B, at time t2 the mapping module 335 determines that VM1 has access to LUN3 via switch 315b, and that VM4 has access to LUN4 via switch 315c.

The mapping module 335 may determine the topology using at least one of: communication attempts; management system recording of software-defined topology; account access relative to accessible objects; and maps of distributed states. In embodiments, determining topology via communication attempts includes the mapping module 335 performing a broadcast or other network check to determine which resources can communicate with one another at a given time.

In embodiments, when determining topology via management system recording of software-defined topology, the mapping module 335 analyzes configuration files of the resources in the environment 300'. A configuration file for a particular resource may include, for example, a unique resource ID and a list of other resources with which the resource is interfaced. Analyzing the configuration files of the resources at a particular time (e.g., at time t1) can reveal that a particular resource has access to another resource (e.g., VM2 is mapped to LUN3 via switch 315b). The analyzing may include, for example, capturing configuration settings from the configuration files and comparing the configuration settings to determine commonality of configuration settings between resources.

In embodiments, when determining topology via account access relative to accessible objects, the mapping module 335 analyzes the credentials of a user account associated with a resource in the environment. For example, when a VM in the environment is deployed under a user account, the mapping module 335 may analyze the credentials of the user account to determine what other resources the user account has access to in the environment.

The mapping module 335 may be configured to determine the topology of the environment at any desired time interval. For example, the mapping module 335 may be configured to determine the topology of the environment once every hour, once every day, or any other shorter or longer time interval. The network management server 320 may provide a user interface (UI) that permits a user to define the desired time interval.

In embodiments, upon determining the topology of the environment as described herein, the mapping module 335 stores a data record that includes data that defines the determined topology. The data record may be stored in a storage device (such as storage device 120 of FIG. 1) associated with the network management server 320. Each respective data record includes a timestamp (e.g., date and time) of when the respective topology was determined.

Still referring to FIGS. 4, 5A, and 5B, in embodiments the network management server 320 includes intrusion module 340 that is configured to: identify an intrusion event in the environment; determine at-risk resources in the environment based on a determined topology at a time corresponding to the intrusion event; and initiate remediation action for the determined at-risk resources. As used herein, an intrusion event may be unauthorized use of, or unauthorized access to, at least one of the resources within the environment. An example of an intrusion event is a malicious attack by a hacker.

In embodiments, the intrusion module 340 identifies an intrusion event in the environment based on at least one of administrator declaration and intrusion detection software. Administrator declaration is a manual method in which a network administrator provides input that signifies the intrusion event. Intrusion detection software may include security and/or forensic software that collects and/or analyzes data associated with actions of the resources in the environment and client devices that access the resources. For example, intrusion detection software may collect and analyze data associated with accessing, probing, or scanning one of the resources in the environment, e.g., multiple failed login attempts by a client device within a time period, port scanning by a client device, large numbers of data requests by a client device, etc. The data collected by the intrusion detection software may be used in an automated or semi-automated manner to flag behavior as an intrusion event. For example, a human user, such as a network administrator, may use the data obtained by the intrusion detection software to perform a forensic analysis of actions taken in the environment and at the particular resource for the purpose of identifying an intrusion event. In another example, the intrusion detection software may automatically detect and indicate an intrusion event based on the collected data satisfying one or more predefined conditions that define an intrusion event. Implementations are not limited to these techniques for detecting an intrusion event, and any suitable techniques (conventional or later developed) may be utilized by the intrusion detection software.

In identifying an intrusion event as described herein, the intrusion module 340 determines a time and location of the intrusion event. The time of the intrusion event may include a start time (e.g., date and time) and duration associated with the detected intrusion event. The location of the intrusion event may include a determination of a particular resource in the environment where the intrusion event was detected. The time and location of the intrusion event may be determined based on at least one of: file creation times, process run times, and account activity logs.

In embodiments, the intrusion module 340 determines at-risk resources in the environment based on a determined topology at a time corresponding to the intrusion event. Specifically, the intrusion module 340 obtains or accesses the stored data that defines the environment topology for the time that corresponds to the determined time of the intrusion event, e.g., by comparing the determined time of the intrusion event to the times associated with the stored data that defines the determined topologies. Additionally, using the determined intrusion location as a starting point, the intrusion module 340 determines at risk resources by determining which resources were accessible by the determined intrusion location at the determined time of the intrusion event. In an illustrative example, suppose that the intrusion module 340 determines that an intrusion event occurred at time t1 (e.g., the intrusion time) at resource VM2 (e.g., the intrusion location). In this example, the intrusion module 340 obtains or accesses the stored data that defines the topology for time t1 and uses the topology to determine which other resources were accessible by VM2. In this example, the stored topology for time t1 indicates that resource VM2 had access to: switch 315a, LUN1, switch 315b, LUN3, switch 315c, and VM3. Accordingly, these resources are deemed at-risk resources, whereas other resources in the environment that were not accessible by VM2 at time t1 (e.g., VM1, LUN2, LUN4, LUN5) may be deemed not at risk. The resource that corresponds to the intrusion location (e.g., VM2 in this example) may be included in the list of at-risk resources.

The determining of at-risk resources as described herein may be performed in an automated manner using the intrusion module 340. For example, the intrusion module 340 may be programmed with logic that is configured to compare the determined intrusion time and intrusion location to the stored data that defines the historic topologies of the environment, and to automatically determine the at-risk resources based on this comparison.

By using implementations described herein, different sets of at-risk resources may be determined for different intrusion events, e.g., since different topologies may correspond to the different intrusion events. For example, a first intrusion event that is determined to have occurred at time t1 and resource VM2 results in a different set of at-risk resources than a second intrusion event that is determined to have occurred at time t2 at resource VM3. In this manner, by retaining timestamped topologies (e.g., maps of system states as the network and storage change), implementations are configured to determine temporally accessible resources (e.g., files or systems) that correspond to a determined intrusion event (e.g., attack period).

In embodiments, the intrusion module 340 initiates remediation action for the determined at-risk resources. The remediation action may include, for example, sending a message to a network administrator identifying the intrusion time, the intrusion location, and the determined at-risk resources. The message may also identify accounts associated with the intrusion location and the determined at-risk resources. Additionally or alternatively, the remediation action may include engaging in a quarantine action to alter the environment to remove access from the at-risk resources to the other resources in the environment. For example, the remediation action may include the management module 330 altering VLANs within the environment, e.g., to isolate the at-risk resources in a VLAN that is not accessible by other resources in the environment. As another example, the remediation action may include the management module 330 resetting the at-risk resources to factory default settings and/or de-provisioning the resource at the determined intrusion location.

Figure 6:
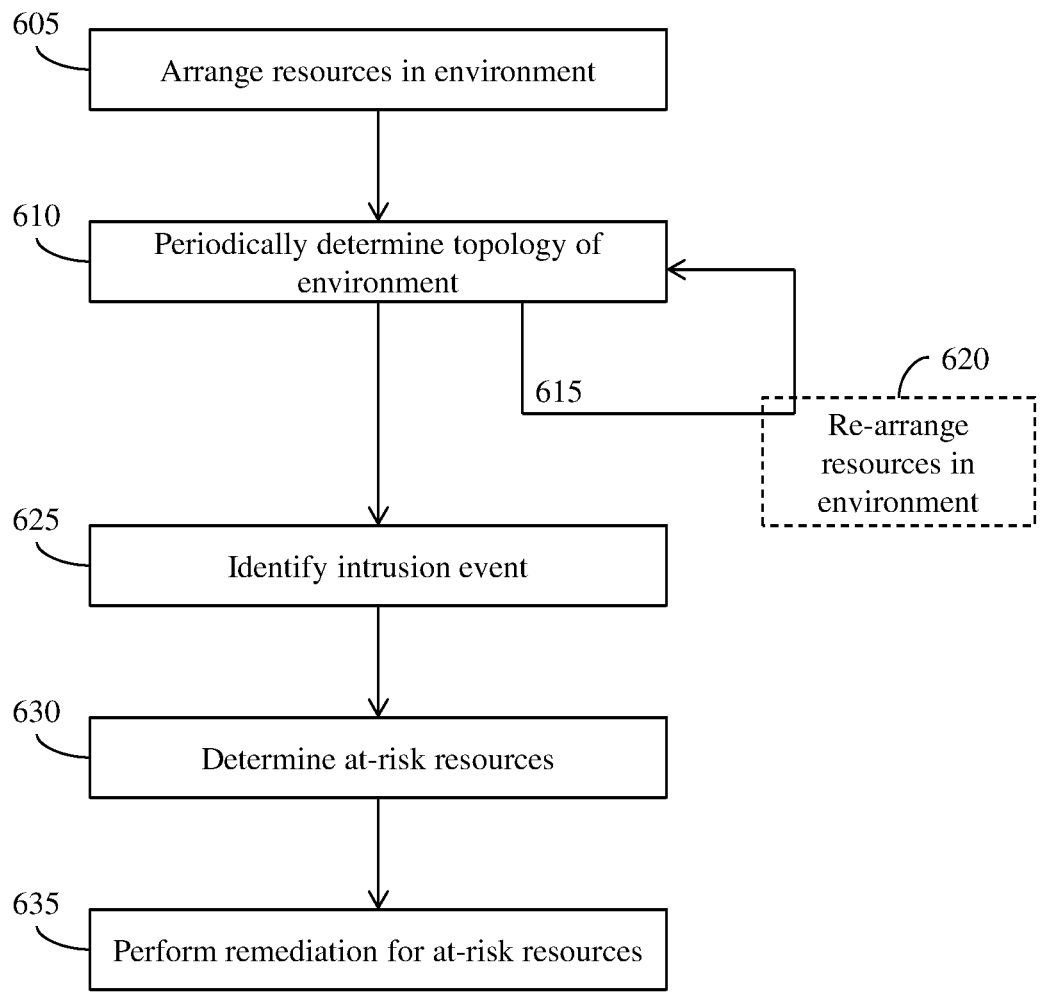
FIG. 6 depicts an exemplary flow for a process in accordance with aspects described herein.

FIG. 6 shows an example flowchart for a process in accordance with aspects described herein. The steps of FIG. 6 may be implemented in the environment of FIGS. 1-4, for example, and are described using reference numbers of elements depicted in FIGS. 1-4. As noted herein, the flowchart illustrates the architecture, functionality, and operation of possible implementations of systems, methods, and computer program products according to various embodiments.

At step 605, resources of an environment are arranged in a configuration. In embodiments, a network management server 320 running a management module 330 causes resources of an environment 300 to be arranged in a desired manner, e.g., by provisioning or un-provisioning resources (e.g., defining VMs, LUNs, etc.), grouping certain ones of the resources together (e.g., defining VLANs), etc. As described with respect to FIG. 4, the management module 330 may utilize SDN and/or SDS techniques to arrange the environment at step 605.

At step 610, a topology of the environment is determined and stored. In embodiments, a mapping module 335 of the network management server 320 determines the topology of the environment and stores data defining the determined topology. The topology indicates which resources have access to other resources within the environment, and may be determined, for example, in the manner described with respect to FIG. 5A. The mapping module 335 may store a data record that includes data that defines the determined topology including a timestamp (e.g., date and time) of when the topology was determined.

As indicated by arrow 615, step 610 is periodically repeated to determine respective topologies of the environment at the different times. As indicated by box 620, the management module 330 may re-arrange the resources of the environment in a new (e.g., different) configuration, in which case a different topology will be determined at the next iteration of step 610, e.g., as illustrated by the first topology at time t1 in FIG. 5A and the second topology at time t2 in FIG. 5B. As described herein, re-arranging the resources refers to, but is not limited to at least one of: create, modify, or remove one or more VLANs; provision, partition, and/or remove network drives or LUNs; and define which VMs are mapped to the LUNs. Step 620 may be performed using similar techniques as step 605 and may be repeated any number of times during normal operation of the environment, e.g., to provide time-differing functionality and/or computing resources to one or more users (e.g., customers) of the environment. Step 610 may be periodically repeated at any desired time interval to determine respective time-changing topologies of the environment.

At step 625, an intrusion event is identified in the environment. In embodiments, an intrusion module 340 of the network management server 320 determines an intrusion time and an intrusion location, e.g., in the manner described with respect to FIGS. 5A and 5B.

At step 630, at-risk resources are determined based on the intrusion time and intrusion location from step 625 and using at least one stored topology from step 610. In embodiments, the intrusion module 340 determines the at-risk resources by determining resources that were accessible by the intrusion location in a topology having a time corresponding to the intrusion time, e.g., in a manner described with respect to FIGS. 5A and 5B.

At step 635, remediation action is performed for the at-risk resources determined at step 630. In embodiments, the intrusion module 340 messages an administrator and/or initiates a quarantine action, e.g., in a manner described with respect to FIGS. 5A and 5B.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of identifying and remediating at-risk resources in a computing environment, comprising:
   periodically determining and storing, by the computer system, respective infrastructure topologies of a computing environment that changes over time by analyzing a configuration file for each of a plurality of resources in the computing environment, the configuration file for a particular resource describing one or more other resources in the computing environment that the particular resource has access to at a particular time, wherein the determining is performed by a computer system communicating with the computing environment;
   detecting, by the computer system, an intrusion event in the computing environment after the periodic determining of the respective infrastructure topologies of the computing environment;
   identifying, by the computer system, a time and a location of the intrusion event, the time comprising a start time and a duration of the intrusion event, the location comprising a particular resource in the computing environment where the intrusion was detected;
   accessing, by the computer system, one or more stored infrastructure topologies that correspond to the identified time of the intrusion event by comparing the determined time of the intrusion event to times associated with the one or more stored infrastructure topologies;
   determining, by the computer system, at-risk resources in the computing environment by analyzing the one or more accessed infrastructure topologies to determine which resources among a plurality of resources in the computing environment were accessible to the particular resource in the computing environment where the intrusion was detected at the time of the intrusion event; and
   performing, by the computer system, a remediation action for the at-risk resources, wherein the remediation action provides protection for temporally at-risk accessible resources that are associated with the determined intrusion event at the time of the intrusion event.

2. The method of claim 1, wherein the periodically determining respective infrastructure topologies is based on at least one of: network communication attempts; software defined topology; account access; and maps of distributed states.

3. The method of claim 1, wherein the intrusion event is identified by one of: administrator declaration; and intrusion detection software.

4. The method of claim 1, wherein identifying an intrusion time and an intrusion location is based on at least one of: file creation times; process run times; and account activity logs.

5. The method of claim 1, wherein the performing the remediation action includes at least one of: transmitting a message to an administrator identifying the determine at-risk resources; and altering the computing environment to isolate the determined at-risk resources.

6. The method of claim 1, wherein:
   the computing environment comprises a cloud computing environment comprising cloud resources;
   the cloud resources each comprise one of a server, storage device, and routing device in the cloud computing environment; and
   the computer system comprises a network management server connected to the cloud computing environment.

7. A system, comprising: a computing environment comprising resources with memory that are re-arranged into different topologies over time; and a server connected to the computing environment and configured to: periodically determine and store a respective topology of the computing environment by analyzing a configuration file for each the resources in the computing environment, the configuration file for a particular resource describing one or more other resources in the computing environment that the particular resource has access to at a particular time; detect an intrusion event in the computing environment after the periodic determining of the respective infrastructure topologies of the computing environment; identify a time and a location of the intrusion event, the time comprising a start time and a duration of the intrusion event, the location comprising particular resource in the computing environment where the intrusion was detected; access one or more stored infrastructure topologies that correspond to the identified time of the intrusion event by comparing the determined time of the intrusion event to times associated with the one or more stored infrastructure topologies; determine at-risk resources in the computing environment by analyzing the one or more accessed infrastructure topologies to determine which resources among a plurality of resources in the computing environment were accessible to the particular resource in the computing environment where the intrusion was detected at the time of the intrusion event; and perform a remediation action for the determined at-risk resources, wherein the remediation action provides protection for temporally at-risk accessible resources that are associated with the determined intrusion event at the time of the intrusion event.

8. The system of claim 7, wherein each of the determined topologies defines resources that are accessible to one another within the computing environment at a respective time.

9. A computer program product for identifying and remediating at-risk resources in a computing environment, the computer program product comprising a non-transitory computer readable storage medium having program instructions embodied therewith, the program instructions being executable by a computer device to cause the computer device to: periodically determine and store a respective topology of a computing environment comprising a number of reconfigurable resources by analyzing a configuration file for each of the resources in the computing environment, the configuration file for a particular resource describing one or more other resources in the computing environment that the particular resource has access to at a particular time; detect an intrusion event including an intrusion time and an intrusion location in the computing environment after the periodic determining of the respective infrastructure topologies of the computing environment, the intrusion time comprising a start time and a duration of the intrusion event, the intrusion location comprising a particular resource in the computing environment where the intrusion was detected; access one or more stored infrastructure topologies that correspond to the intrusion time of the intrusion event by comparing the determined time of the intrusion event to times associated with the one or more stored infrastructure topologies; determine at-risk resources in the computing environment based on the determined intrusion event and the corresponding one or more accessed infrastructure topologies, by analyzing the one or more accessed infrastructure topologies to determine which resources among a plurality of resources in the computing environment were accessible to the particular resource in the computing environment where the intrusion was detected at the time of the intrusion event; perform a remediation action for the set of resources of the determined at-risk resources including at least one of: transmitting a message to an administrator identifying the determined at-risk resources; and altering the computing environment to isolate the determined at-risk resources, wherein the remediation action provides protection for temporally at-risk accessible resources that are associated with the determined intrusion event at the time of the intrusion event.

10. The computer program product of claim 9, wherein the periodically determining the respective topologies is based on at least one of: network communication attempts; software defined topology; account access; and maps of distributed states.

11. The system of claim 7, wherein the re-arranging is controlled by a network management module of the computer system using at least one of software-defined networking and software-defined storage.

12. The system of claim 7, wherein performing the remediation action is performed by including at least one of: transmitting a message to an administrator identifying the determined at-risk resources; and altering the computing environment to isolate the determined at-risk resources.

13. The method of claim 1, further comprising analyzing user credentials of a user account associated with the resources in the computing environment, wherein the periodically determining of the respective infrastructure topologies of the computing environment that changes over time is based on the analysis of the user credentials associated with respective resources in the computing environment.

14. The method of claim 13, wherein:
each of the respective infrastructure topologies defines resources that are accessible to one another within the computing environment at a respective time, and
the determining the at-risk resources comprises determining the corresponding one of the infrastructure topologies by correlating an intrusion time of the intrusion event to one of the respective times associated with the respective infrastructure topologies, and determining, using the corresponding one of the infrastructure topologies, a set of resources in the computing environment that were accessible by a resource when the intrusion event occurred.

15. The method of claim 14, further comprising re-arranging the computing environment from a first one of the respective infrastructure topologies to a second one of the respective infrastructure topologies, different from the first one of the respective topologies, and re-determining the respective topology of the computing environment after the re-arranging.

16. The method of claim 15, wherein the re-arranging is controlled by a network management module of the computer system using at least one of software-defined networking and software-defined storage.

17. The system of claim 7, wherein the server is further configured to analyze user credentials of a user account associated with the resources in the computing environment, wherein the periodic determining of the respective topology of the computing environment is based on the analysis of the user credentials associated with respective resources in the computing environment.

18. The system of claim 17, wherein:
each of the respective infrastructure topologies defines resources that are accessible to one another within the computing environment at a respective time, and
the determining the at-risk resources comprises determining the corresponding one of the infrastructure topologies by correlating an intrusion time of the intrusion event to one of the respective times associated with the respective infrastructure topologies, and determining, using the corresponding one of the infrastructure topologies, a set of resources in the computing environment that were accessible by a resource when the intrusion event occurred.

19. The computer program product of claim 9, the program instructions being executable by a computer device to further cause the computer device to analyze user credentials of a user account associated with the resources in the computing environment, wherein the periodic determining of a respective topology is based on the analysis of the user credentials associated with respective resources in the computing environment.

* * * * *